United States Patent
Litvin et al.

(10) Patent No.: US 6,205,879 B1
(45) Date of Patent: Mar. 27, 2001

(54) HELICAL AND SPUR GEAR DRIVE WITH DOUBLE CROWNED PINION TOOTH SURFACES AND CONJUGATED GEAR TOOTH SURFACES

(75) Inventors: Faydor L. Litvin, Skokie; Pin Hao Feng, Chicago, both of IL (US); Sergey A Lagutin, Moscow (RU); Dennis P Townsend, Westland, OH (US); Thomas M Sep, Troy, MI (US)

(73) Assignees: Visteon Global Technologies, Inc., Dearborn, MN (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/340,824

(22) Filed: Jun. 28, 1999

(51) Int. Cl.[7] .......................... F16H 55/08; F16H 55/10; B23F 1/00
(52) U.S. Cl. ................................ 74/457; 74/462; 74/458; 409/10; 409/32
(58) Field of Search .......................... 74/457, 460, 461, 74/462, 458; 29/893, 893.3

(56) References Cited

U.S. PATENT DOCUMENTS

| | | | |
|---|---|---|---|
| 4,224,834 | * 9/1980 | Kotthaus | 74/462 |
| 5,083,474 | * 1/1992 | Rouverol | 74/461 |
| 5,341,699 | * 8/1994 | Rouverol | 74/462 |
| 5,823,857 | * 10/1998 | Tan | 451/47 |
| 6,080,199 | * 6/2000 | Umeyama et al. | 703/1 |

OTHER PUBLICATIONS

Silencing high-speed gearheads, Bernd Strober, Strober Drives, Inc., Powertrain Design, pp. 33–35, Nov. 1998.
Industry in Motion, New coupling keeps up with demand, Powertrain Design, pp. 10, Nov. 1998.

* cited by examiner

Primary Examiner—Charles A Marmor
Assistant Examiner—Tisha D. Waddell

(57) ABSTRACT

Helical or spur gear drive comprising a driven gear and driving gear wherein the driving gear has double crowned teeth defined as (i) an envelope to a family of surfaces generated by a skew or straight rack-cutter having a parabolic tooth profile in normal section and then (ii) as an envelope to a family of tool surfaces that are generated while the tool performs a plunging motion with respect to the driving gear in the direction of the shortest distance between the axes of rotation of the tool and the driving gear and tool plunging motion is varied by a parabolic function, whose variable is displacement of the tool in a direction parallel to the rotational axis of the driving gear. The driven gear has a tooth surface defined as the envelope to a family of surfaces generated by a rack-cutter which surface is parabolic cylinder or a plane. The generated pinion/gear tooth surfaces are in theoretical point contact at every instant and they produce a preselected parabolic function of transmission errors in the process of meshing. The pinion/gear exhibit reduced vibration and noise, reduced shift of bearing contact caused by misalignment, and reduced contact stresses due to convex-concave contact of tooth surfaces.

10 Claims, 2 Drawing Sheets

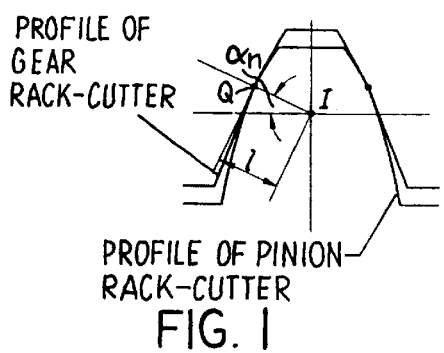
FIG. 1
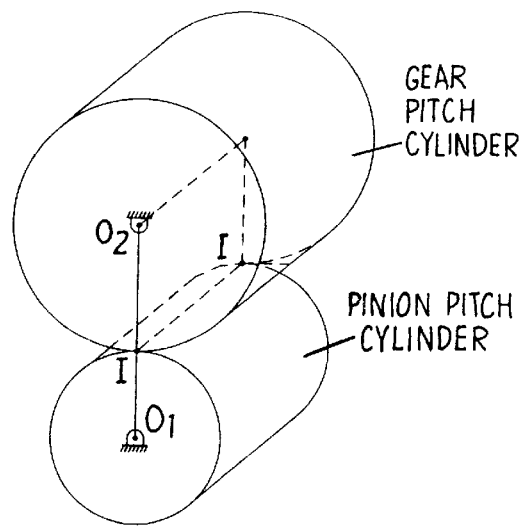
FIG. 4
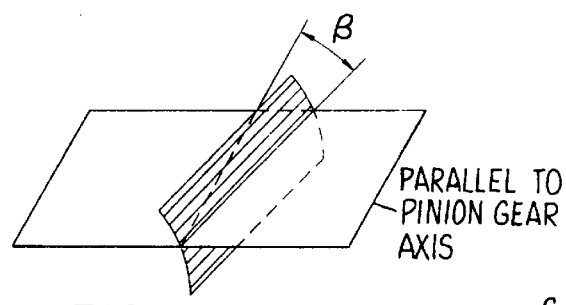
FIG. 2A
FIG. 2B
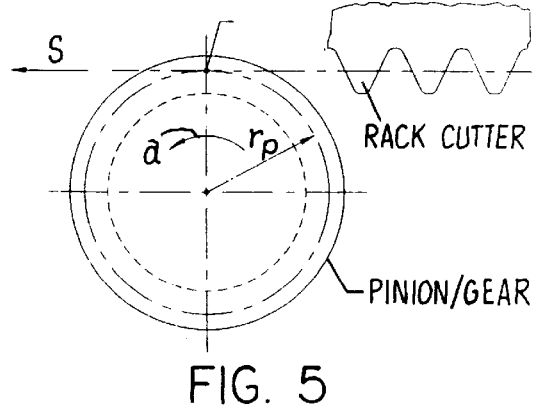
FIG. 5
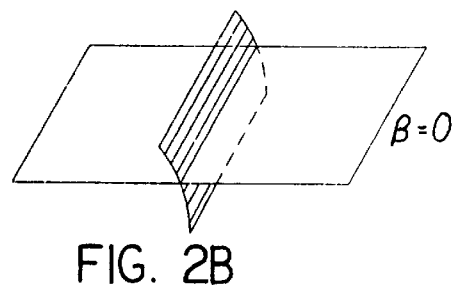
FIG. 3
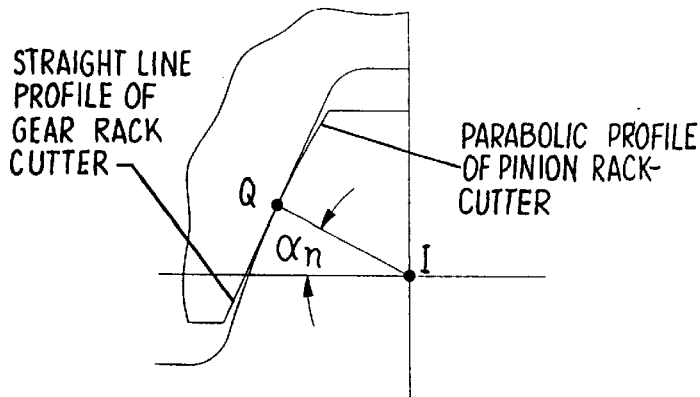
FIG. 6

HELICAL AND SPUR GEAR DRIVE WITH DOUBLE CROWNED PINION TOOTH SURFACES AND CONJUGATED GEAR TOOTH SURFACES

BACKGROUND OF THE INVENTION

1. Field of the Invention

The present invention relates to improved helical and spur gear drives provided with meshing pinion/gear tooth surfaces that reduce vibration and noise and provide favorable bearing contact of tooth surfaces under load and, more particularly, to improved helical and spur gears wherein the pinion tooth surface is double crowned and is in mesh with a conjugated gear tooth surface.

2. Description of Related Art

Helical and spurs gears of existing design for transformation of rotation under load between parallel axes are known to be sensitive to errors in alignment such as the change of shaft angle and the lead angles of pinion/gear tooth surfaces that cause: (i) a function of transmission errors of undesirable shape and unacceptable magnitude; (ii) shift of the bearing contact, and (iii) adverse conditions of transfer of meshing between neighboring teeth accompanied by unacceptable elastic tooth deformation. The load capacity of conventional involute gearing is limited as a result of high level of contact and bending stresses.

An object of the present invention is to provide improved helical and spur gear drives that overcome the above noted deficiencies of existing helical and spur gears.

SUMMARY OF THE INVENTION

The present invention provides an improved gear drive of the helical or spur types comprising a driving gear (i.e. a pinion) with a tooth surface that is uniquely double crowned in the profile and longitudinal directions and a driven gear provided with a conjugated tooth surface that can comprise a conventional involute type tooth surface or a uniquely modified tooth surface.

The double crowned tooth surface of the driving gear is generated as (i) the envelope to a family of surfaces generated by a skew rack-cutter having a parabolic tooth profile in normal section while the rack-cutter and the driving gear perform related translational and rotational motions, respectively, and then (ii) as the envelope to a family of tool surfaces that are generated while the tool performs a plunging motion with respect to the driving gear in the direction of the shortest distance between the axes of rotation of the tool and the driving gear with tool plunging motion varied by a parabolic function. For example, the tool is translated in a direction parallel to the pinion rotational axis, and the magnitude of its plunge is executed by a parabolic function in the direction of the shortest distance between the crossed axes of the tool and the driving gear (pinion).

The driven gear of a helical gear drive includes a conjugated tooth surface defined as the envelope to a family of surfaces generated by a skew rack-cutter having a tooth surface of parabolic profile in normal section. Such a helical driven gear and double crowned helical drive pinion provide concave-convex contact of the tooth surfaces with a small difference of tooth surface curvatures that results in substantial reduction of contact stresses and increased strength to bending stresses.

Alternately, the conjugated tooth surface of the helical driven gear can comprise conventional screw involute helical teeth. The driven gear of a spur gear drive includes a conjugated tooth surface defined as the envelope to a family of a straight rack-cutter surface having a tooth surface of parabolic profile in normal section. Such a spur driven gear and double crowned helical drive pinion provide concave-convex contact of the tooth surfaces with a small difference of tooth surface curvatures that results in substantial reduction of contact stresses and increased strength to bending stresses.

Alternately, the conjugated tooth surface of the driven spur driven gear can comprise a conventional cylindrical involute spur tooth surface.

The meshing and contact of the above described tooth surfaces provide the following characteristics and advantages: (i) the driving gear/driven gear tooth surfaces are at every instant in theoretical point contact that spreads under load over an elliptical area of the tooth surfaces, (ii) a parabolic function of transmission errors of a preselected magnitude is produced during meshing of the pinion/gear tooth surfaces and is capable of absorbing discontinuous, almost linear functions of transmission errors caused by pinion/gear misalignment, (iii) a localized and stabilized bearing contact of pinion/gear tooth surfaces is provided by the instantaneous contact ellipses, and (iv) the transfer of meshing between the neighboring teeth is improved to decrease the total tooth elastic deformation, enabling increase of the contact ratio (i.e. the average number of teeth being in contact simultaneously).

BRIEF DESCRIPTION OF THE DRAWINGS

FIG. 1 is a normal sectional view of pinion and gear rack-cutters taken in a plane that is perpendicular to the direction of rack-cutter parabolic cylinders, wherein the profiles of the rack-cutters are mismatched parabolas by virtue of having different parabola coefficients.

FIGS. 2A and 2B are schematic views of the parabolic cylinders of respective skew and straight rack-cutters where angle beta is formed by the generatrix of the parabolic cylinder and a line that is parallel to the pinion (gear) axis. Angle beta is zero for the straight rack-cutter.

FIG. 3 is a normal sectional view of a pinion rack-cutter having a parabolic tooth surface profile and a gear rack-cutter having a straight line tooth profile applied to generate a conventional involute helical or spur gear.

FIG. 4 illustrates pinion and gear pitch cylinders in tangency along I—I that is the instantaneous axis of rotation in relative motion. Line $O_1$–$O_2$ is the shortest distance between the pinion and gear axes of rotation $O_1$ and $O_2$, respectively.

FIG. 5 illustrates generation of a pinion (gear) by a rack-cutter. The rack-cutter performs translation motion in direction of arrow s and the gear performs rotational motion in the direction of arrow a.

FIG. 6 illustrates the enveloping process in planar gearing and shows the family of generating profiles and the generated profile produced as the envelope to the family of generating profiles.

DETAILED DESCRIPTION OF THE PREFERRED EMBODIMENT

It is known that conditions of meshing of a driving gear (i.e. pinion) and a driven gear in a misaligned gear drive can be characterized at each cycle of meshing as a sum of two functions (i) and (ii) as follows:

(i) a theoretical function represented by $$\phi_2 = \frac{N_1}{N_2}\phi_1 \quad (1)$$

where $\phi_2$ and $\phi_1$ are the angles of rotation of the driven gear and the driving gear, respectively, and $N_1$ and $N_2$ are the gear and pinion tooth numbers, and (ii) a function of transmission errors designated $\Delta\phi_2\,(\phi_1)$ where the resulting transmission function is:

$$\phi_2 = \frac{N_1}{N_2}\phi_1 + \Delta\phi_2(\phi_1) \quad (2)$$

Figure 9:
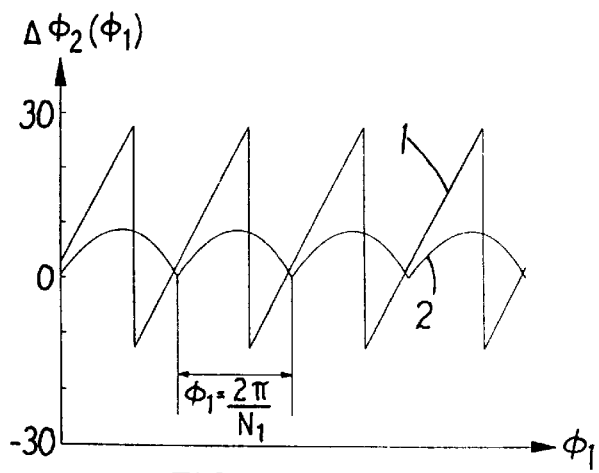
FIG. 9 illustrates two types of functions of transmission errors of misaligned gear drives that correspond to gears of existing design (graph 1) and gears pursuant to the invention (graph 2), respectively.
Figure 12:
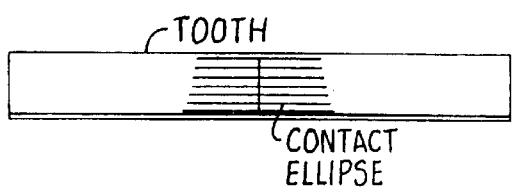
FIG. 12 illustrates the bearing contact of a spur gear drive pursuant to the invention where the path of contact is oriented in the profile direction and the bearing contact is oriented across the tooth surface.
Figure 11:
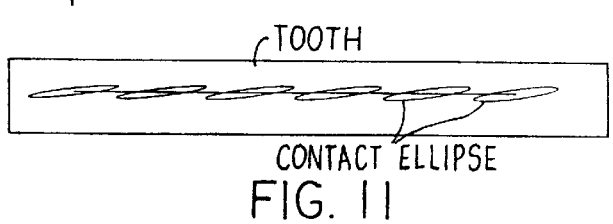
FIG. 11 illustrates the bearing contact of a helical gear drive pursuant to the invention where the path of contact is a helix and the bearing contact is oriented longitudinally.

The present invention achieves a change of the unfavorable shape of the function of transmission errors $\Delta\phi_2\,(\phi_1)$ (e.g. corresponding to linear function 1 of FIG. 9) to a predesigned parabolic function of transmission errors (e.g. corresponding to parabolic function 2 of FIG. 9). Then, the transmission function $\phi_2\,(\phi_1)$ is defined as:

$$\phi_2 = \frac{N_1}{N_2}\phi_1 - a\phi_1^2 \quad (3)$$

where $\alpha$ is the parabola coefficient.

Function 1 of FIG. 9 illustrates that the function of transmission errors of existing gear drive is a discontinuous one and the transfer of meshing at the end (and beginning) of the cycle of meshing is accompanied with a jump of angular velocity and a substantial increase of acceleration. Function 2 is representative of the parabolic function of transmission errors pursuant to the invention and illustrates achievement of a substantial reduction of maximal transmission errors.

Functions 1 and 2 were obtained by computerized simulation of meshing of a misaligned helical or spur gear drive with the error of shaft angle $\Delta\gamma=3$ arc min.

The driven gear in the process of transformation of rotation lags with respect to the driving gear (pinion). The predesigned parabolic function of transmission errors pursuant to the invention absorbs the discontinuous linear functions of transmission errors caused by gear drive misalignment and therefore reduces vibration and noise of the gear drive. The predesigned parabolic function of transmission errors is achieved: (i) by double crowning of the driving gear (pinion) in an embodiment involving a helical gear drive (see FIG. 7) and (ii) by providing certain relations between the curvatures of profiles of rack-cutters in an embodiment involving a spur gear drive.

The present invention provides in one embodiment a gear drive of the helical type comprising a driven gear and driving gear (i.e. a pinion) wherein the driving gear (pinion) is provided with double crowned, non-helicoid tooth surface that is crowned in the profile and longitudinal directions and the driven gear is provided with a conjugated tooth surface that can comprise a conventional screw involute type tooth surface or a uniquely modified screw tooth surface.

In an embodiment of the invention, a so-called Novikov type helical gear drive is provided comprising a double crowned pinion and conjugated driven gear. The tooth surface of the pinion (driving gear) is defined as generated by the sequence of two enveloping processes: (a) as the envelope to a pinion skew rack-cutter surface defined as a parabolic cylinder and then (b) as the envelope to a surface of a plunging tool (grinding disk or worm) while the plunge is executed by a parabolic function in which translational motion of the tool is provided in a direction parallel to the pinion rotational axis and the plunge of the tool is performed in the direction of the shortest distance between the crossed axes of the tool and the driving gear (pinion). The double crowned pinion tooth surface that is generated in this manner differs from a conventional helicoid that comprises a screw surface defined as a surface with a constant screw parameter.

The tooth surface of the helical driven gear is defined as the envelope to a family of a skew rack-cutter surface that is defined as a parabolic cylinder.

The present invention provides in another embodiment a gear drive of spur type comprising a driven gear and driving gear (i.e. a pinion) wherein the driving gear is provided with double crowned, non-cylindrical tooth surface that is crowned in the profile and longitudinal directions and the driven gear is provided with a conjugated tooth surface that can comprise a conventional screw involute type tooth surface or a uniquely modified screw tooth surface. In the embodiment of a spur gear drive, the tooth surface of the pinion (driving gear) is defined as generated by the sequence of two enveloping processes: (a) as the envelope to a pinion straight rack-cutter surface defined as a parabolic cylinder and then (b) as the envelope to a surface of a plunging tool (grinding disk or worm) while the plunge is executed by a parabolic function in which translational motion of the tool is provided in a direction parallel to the pinion rotational axis and the plunge of the tool is performed in the direction of the shortest distance between the crossed axes of the tool and the driving gear (pinion). The double crowned pinion tooth surface that is generated in this manner differs from a conventional cylindrical involute surface.

The tooth surface of the spur driven gear is defined as the envelope to a family of a straight rack-cutter surface that is defined in one embodiment as a plane and in another embodiment as a parabolic cylinder.

Referring to FIG. 1, the parabolic profiles of mating rack-cutters to generate separately a profile crowned pinion tooth surface and a conjugated tooth surface of the driven gear are shown in tangency at point Q in normal section. The common normal to the profiles is shown passing through point I that belongs to the instantaneous axis of rotation I—I of the pinion and gear pitch cylinders, FIG. 4. Due to the small difference of curvature of the parabolic rack-cutter tooth profiles, the contact stresses between neighboring teeth are substantially reduced. The surfaces of the rack-cutters are parabolic cylinders that are in tangency along the common generatrix of parabolic cylinders that passes through point Q. The pressure angle of the tooth profiles in normal section is designated by $\alpha_n$. The helical driven gear is generated using the skew rack-cutter which has a skew longitudinal tooth profile, FIG. 2, defined by an angle beta relative to the pinion gear rotation axis. A straight rack-cutter which has a straight longitudinal tooth profile defined by an angle beta equal to zero relative to the pinion (gear) rotation axis is used to generate a spur driven gear.

FIG. 5 illustrates schematically the generation of a pinion (or driven gear) by a rack-cutter. The rack-cutter performs translational motion in direction of arrow s, and the pinion (or driven gear) performs rotational motion in the direction of arrow a. The rack-cutter displacement s and angle of pinon (gear) rotation φ are related as follows:

$$s = r_p \phi \tag{4}$$

where $r_p$ is the radius of the pitch cylinder.

FIG. 6 illustrates the enveloping process in planar gearing and shows the family of generating profiles and the generated profile produced as the envelope to the family of generating profiles. The enveloping process is applied in similar manner in practice of the invention for generation in three dimensional space of the pinion (driven gear) tooth surface profile crowned by a rack-cutter surface.

Figure 7A:
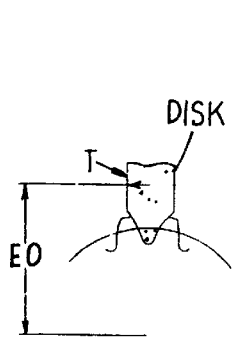
FIGS. 7A and 7B illustrate the plunging motion of the tool to form longitudinal crowning of the driving gear, FIG. 7B being a partial elevational view of FIG. 7A.
Figure 7B:
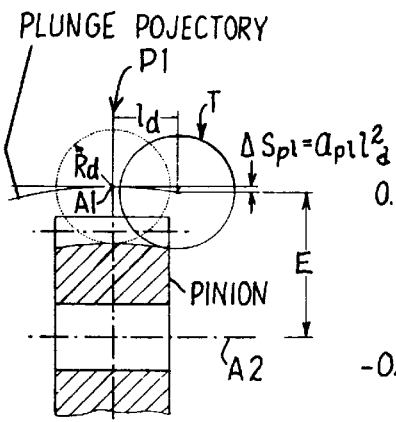

FIG. 7A and 7B illustrate schematically the generation of longitudinal crown of the pinion by a rotating plunging tool T, such as a grinding (or cutting) disk having radius $R_d$. The tooth surface of the pinion initially is considered as the envelope to the pinion parabolic rack-cutters, FIG. 1; therefore, the profile of the rotating plunging tool T is defined by this first envelope, see FIG. 7A, as described in "Gear Geometry and Applied Theory" by F. L. Litvin, Prentice Hall, 1994, chapter 21.

FIG. 7B shows that while the disk tool T is translated in a direction parallel to the axis of rotation of the pinion, the disk tool is plunged in the direction of the instantaneous shortest distance E between the crossed axes A1, A2 of the tool and the pinion. The magnitude of the plunge motion is executed by a parabolic function represented as:

$$\Delta s_{pl} = a_{pl} l^2_d \tag{5}$$

where $a_{pl}$ is the parabola coefficient; $I_d$ is the displacement of the disk tool in the direction parallel to the pinion axis and is measured from the middle position P1 of the disk tool relative to the pinion axis. Distance $E_o$ is the initial magnitude of the shortest distance shown in FIG. 7A.

An alternative method of generation of the tooth surface of driving gear (pinon) by a plunging tool is based on application of a grinding worm instead of a grinding disk. The worm thread surface is defined as conjugated to the respective pinion rack-cutter, skew rack-cutter for a helical type of gear drive and straight rack-cutter for a spur type of gear drive. The plunge motion is provided similar to the plunging motion of the grinding disk.

Figure 10A:
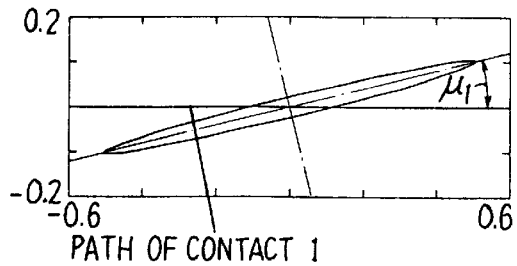
FIGS. 10A and 10B illustrate the magnitudes of the instantaneous contact ellipse for Novikov type helical gears pursuant to the invention (FIG. 10A) and for conventional Novikov type helical gears (FIG. 10B) where angle $\mu_1$ shows the orientation of the instantaneous contact ellipse.
Figure 8:
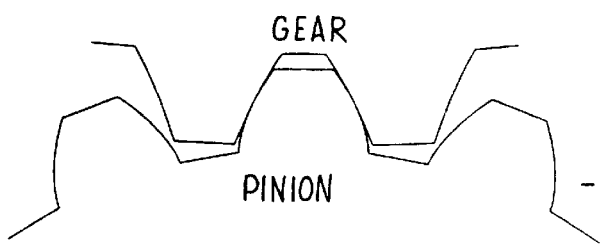
FIG. 8 is a transverse section of Novikov type helical gears generated using two parabolic rack-cutters pursuant to one embodiment of the invention.
Figure 10B:
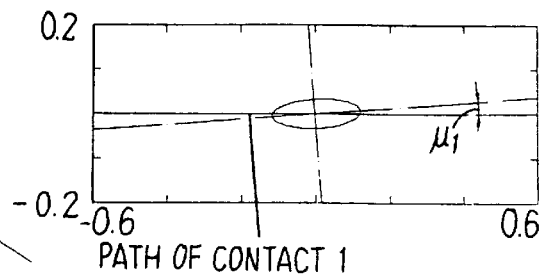

FIG. 8 is a transverse section of Novikov-Wildhaber type helical gears generated using two parabolic rack-cutters as described above pursuant to the embodiment of the invention. The Novikov type helical gears so generated are advantageous in having low contact stresses and increased strength to bending stresses as well as reduced vibration and noise as compared to existing Novikov-Wildhaber type gears, Russian Patent 109,750 granted 1956, which are generated using imaginary rack-cutters having circular arc profiles. For example, FIGS. 10A and 10B illustrate the magnitude of the instantaneous contact ellipse for the Novikov-Wildhaber type gears of the invention versus that for the existing Novikov-Wildhaber type gear generated using rack-cutters with circular arc tooth profiles. It is apparent that there is an increased area or dimension of contact ellipse of the Novikov-Wildhaber type helical gears of the invention. The Novikov-WIldhaber type helical gears of the invention may find use in high-speed transmissions due to the reduction in noise and vibration and the potential to use hardened and then ground teeth.

In another embodiment of the invention, a helical gear drive is provided comprising a double crowned pinion and conjugated driven gear provided with a conventional screw involute tooth surface. The double crowned pinion is generated as described above using a parabolic profile, FIG. 1, of a skew pinion rack cutter followed by tool plunging, FIGS. 7A and 7B, to have profile and longitudinal crowning. The conventional screw involute tooth surface of the driven gear is generated using a skew rack-cutter with straight-line tooth profile, FIG. 3, as is well known in conventional involute gearing.

FIG. 3 illustrates that the tooth profiles of the rack-cutters are in tangency at point Q, and that the common normal to the profiles passes through point I that belongs to the instantaneous axis of rotation I—I, see FIG. 4. This embodiment achieves a parabolic function of transmission errors, localization and stabilization of bearing contact, and improved conditions of transfer of meshing, although contact stresses are not substantially reduced. This embodiment offers advantages with respect to simplification of gear manufacture by permitting use of conventional hob or grinding worm tools.

Further embodiments of the invention involve spur gear drives. In one embodiment, a spur gear drive is provided comprising a double crowned spur pinion and conjugated driven spur gear provided with a conventional cylindrical involute tooth surface. The double crowned spur pinion is generated as described above using a parabolic profile, FIG. 3, of a straight pinion rack-cutter (angle beta=0 in FIG. 2), as opposed to skew rack-cutter used for the helical gear drives, followed by tool plunging to impart profile and longitudinal tooth crowning. The conventional involute tooth surface of the driven spur gear is generated using a straight rack-cutter with parabolic profile tooth profile, FIG. 1.

In another embodiment, the spur gear drive is provided comprising a double crowned spur pinion described above and conjugated driven spur gear provided with a conventional cylindrical involute tooth surface generated using a straight rack-cutter with straight-line tooth profile, FIG. 3, as is well known in conventional involute gearing.

These spur gear embodiments achieve a parabolic function of transmission errors for reduction of noise and vibration, localization and stabilization of bearing contact, improved conditions of transfer of meshing, and substantially reduced contact stresses for the first described spur gear embodiment as a result of the convex-concave contact of the pinion and driven spur gear.

It is to be understood that the invention has been described with respect to certain specific embodiments thereof for purposes of illustration and not limitation. The present invention envisions that modifications, changes, and the like can be made therein without departing from the spirit and scope of the invention as set forth in the following claims.

What is claimed is:

1. A helical gear drive comprising a driven gear and driving gear, said driving gear having a double crowned tooth surface defined as (i) the envelope to a family of surfaces generated by a skew rack-cutter having a parabolic tooth profile in normal section while the rack-cutter and the driving gear perform related translational and rotational motions, respectively, and then (ii) as the envelope to a family of tool surfaces that are generated while the tool performs a plunging motion with respect to the driving gear in the direction of the shortest distance between the axes of rotation of the tool and the driving gear and tool plunging motion is varied by a parabolic function, whose variable is displacement of the tool in a direction parallel to the rotational axis of the driving gear.

2. The helical gear drive of claim 1 that produces a preselected parabolic function of transmission errors in the process of meshing of the driving gear and driven gear.

3. The helical gear drive of claim 1 wherein said driven gear is defined as the envelope to a family of surfaces generated by a skew rack-cutter having a tooth surface of parabolic profile in normal section.

4. The helical gear drive of claim 1 wherein said driven gear is defined as the envelope to a family of surfaces generated by a skew rack-cutter having a tooth surface as a plane in normal section.

5. A spur gear drive comprising a driven gear and driving gear, said driving gear having double crowned tooth surface defined as (i) an envelope to a family of surfaces generated by a straight rack-cutter having a parabolic tooth profile in normal section while the rack-cutter and the driving gear perform related translational and rotational motions, respectively, and then (ii) as the envelope to a family of tool surfaces that are generated while the tool performs a plunging motion with respect to the driving gear in the direction of the shortest distance between the axes of rotation of the tool and the driving gear and tool plunging motion is varied by a parabolic function, whose variable is displacement of the tool in a direction parallel to the rotational axis of the driving gear.

6. The spur gear drive of claim 5 that produces a preselected parabolic function of transmission errors in the process of meshing of the driving gear and the driven gear.

7. The spur gear drive of claim 5 wherein said driven gear is defined as the envelope to a family of surfaces generated by a straight rack-cutter having tooth surfaces of parabolic profile in normal section.

8. The spur gear drive of claim 5 wherein said driven gear is defined as the envelope to a family of surfaces generated by a straight rack-cutter having a tooth surface as a plane in normal section.

9. Method of generating a double crowned tooth surface of a helical gear, comprising crowning in profile and longitudinal directions by defining the tooth surface as (i) an envelope to a family of surfaces generated by a skew rack-cutter having a parabolic tooth profile in normal section while the rack-cutter and a driving gear perform related translational and rotational motions, respectively, and then (ii) as an envelope to a family of tool surfaces that are generated while the tool performs a plunging motion with respect to the driving gear in the direction of the shortest distance between the axes of rotation of the tool and the driving gear and tool plunging motion is varied by a parabolic function, whose variable is displacement of the tool in a direction parallel to the rotational axis of the driving gear.

10. Method of generating a double crowned tooth surfaces of a spur gear, comprising crowning in profile and longitudinal directions by defining the tooth surface as (i) an envelope to a family of surfaces generated by a straight rack-cutter having a parabolic tooth profile in normal section while the rack-cutter and a driving gear perform related translational and rotational motions, respectively, and then (ii) as an envelope to a family of tool surfaces that are generated while the tool performs a plunging motion with respect to the driving gear in the direction of the shortest distance between the axes of rotation of the tool and the driving gear and tool plunging motion is varied by a parabolic function, whose variable is displacement of the tool in a direction parallel to the rotational axis of the driving gear.

* * * * *